US009927988B2

(12) United States Patent
Lesartre et al.

(10) Patent No.: US 9,927,988 B2
(45) Date of Patent: Mar. 27, 2018

(54) DATA MOVE ENGINE TO MOVE A BLOCK OF DATA

(71) Applicant: Hewlett-Packard Development Company, L.P., Houston, TX (US)

(72) Inventors: Gregg B. Lesartre, Ft. Collins, CO (US); Russ W. Herrell, Ft. Collins, CO (US); Dale C. Morris, Steamboat Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/902,962

(22) PCT Filed: Jul. 31, 2013

(86) PCT No.: PCT/US2013/052990
§ 371 (c)(1),
(2) Date: Jan. 5, 2016

(87) PCT Pub. No.: WO2015/016903
PCT Pub. Date: Feb. 5, 2015

(65) Prior Publication Data
US 2016/0170670 A1    Jun. 16, 2016

(51) Int. Cl.
*G06F 3/06* (2006.01)
*G06F 12/02* (2006.01)
(Continued)

(52) U.S. Cl.
CPC .......... *G06F 3/0619* (2013.01); *G06F 3/0649* (2013.01); *G06F 3/0685* (2013.01);
(Continued)

(58) Field of Classification Search
CPC .... G06F 3/0619; G06F 3/0649; G06F 3/0685; G06F 12/023; G06F 12/0891; G06F 12/12; G06F 13/28; G06F 2212/1032
See application file for complete search history.

(56) References Cited

U.S. PATENT DOCUMENTS 5,475,860 A    12/1995 Ellison et al.
6,073,227 A     6/2000 Abily et al.
(Continued)

FOREIGN PATENT DOCUMENTS

CN    101410812    4/2009

OTHER PUBLICATIONS

Fang, Z. et al., "Active Memory Controller", (Research Paper), Jan. 17, 2012, 26 pages, http://www.cs.utah.edu/~zfang/jsc12.pdf.
(Continued)

*Primary Examiner* — Aracelis Ruiz
(74) *Attorney, Agent, or Firm* — Hewlett Packard Enterprise Patent Department

(57) ABSTRACT

Examples disclosed herein provide moving a block of data between a source address and a target address. The examples disclose initiating a data move engine to move the block of data from the source address to the target address. Additionally, the examples disclose moving the block of data from the source address to the target address in a manner which allows a processor to concurrently access the block of data during the move.

15 Claims, 6 Drawing Sheets

(51) Int. Cl.
 *G06F 12/08* (2016.01)
 *G06F 12/12* (2016.01)
 *G06F 13/28* (2006.01)
 *G06F 12/0891* (2016.01)

(52) U.S. Cl.
 CPC ........ *G06F 12/023* (2013.01); *G06F 12/0891* (2013.01); *G06F 12/12* (2013.01); *G06F 13/28* (2013.01); *G06F 2212/1032* (2013.01)

(56) References Cited

U.S. PATENT DOCUMENTS

| | | | |
|---|---|---|---|
| 6,831,654 B2 | 12/2004 | Pether et al. | |
| 6,907,494 B2 | 6/2005 | Arimilli et al. | |
| 7,130,973 B1 | 10/2006 | Chong et al. | |
| 7,363,446 B2 | 4/2008 | Higaki et al. | |
| 7,500,072 B2 * | 3/2009 | Arndt ...................... | G06F 13/28 711/154 |
| 7,702,864 B2 | 4/2010 | Andre et al. | |
| 8,447,920 B1 | 5/2013 | Syu | |
| 2002/0116555 A1 | 8/2002 | Somers et al. | |
| 2003/0033454 A1* | 2/2003 | Walker .................... | G06F 13/28 710/22 |
| 2004/0111576 A1 | 6/2004 | Arimilli et al. | |
| 2005/0050268 A1* | 3/2005 | Yoshida ................. | G06F 3/0611 711/114 |
| 2006/0106972 A1 | 5/2006 | Gorobets et al. | |
| 2007/0088929 A1* | 4/2007 | Hanai .................... | G06F 3/0605 711/165 |
| 2007/0260839 A1 | 11/2007 | Arndt | |
| 2008/0279005 A1* | 11/2008 | France ................. | G06F 12/0246 365/185.11 |

OTHER PUBLICATIONS

International Search Report and Written Opinion dated May 23, 2014, PCT Patent Application No. PCT/US2013/052990 dated Jul. 31, 2013 (ISA/KR).

* cited by examiner

DATA MOVE ENGINE TO MOVE A BLOCK OF DATA

CLAIM FOR PRIORITY

The present application is a national stage filing under 35 U.S.C. § 371 of PCT application number PCT/US2013/052990, having an international filing date of Jul. 31, 2013, the disclosure of which is hereby incorporated by reference in its entirety.

BACKGROUND

Non-volatile memories (NVM) may present various challenges to a memory system. For example, memory wear-out and/or latency issues may be associated with NVM. These issues may cause corrupt and/or delayed data.

BRIEF DESCRIPTION OF THE DRAWINGS

In the accompanying drawings, like numerals refer to like components or blocks. The following detailed description references the drawings, wherein.

DETAILED DESCRIPTION

Memory systems may include engines for relocating data from a non-volatile memory when the memory may be experiencing wear-out and/or latency issues. These engines provide limited access to the data as a program and/or device may wait a period of time to complete a move before accessing the data. This may also create an additional latency period to access the data.

To address these issues, examples disclosed herein initiate a data move engine to move a block of data from a source address to a target address. Additionally, the examples disclosed herein move the block of data from the source address to the target address in a manner which enables a processor to access the block of data concurrently during the move. This maintains immediate access to the block of data throughout the moving process. Further, by moving the block of data from the source address to the target address, the data move engine transparently migrates data to prevent wear-out and reduce the associated latency. Furthermore, in allowing immediate access to the block of data being moved, the data move engine offers increased system performance.

In another implementation, the data move engine receives a read operation corresponding to a line of data in the block of data. In this implementation, the data move engine may reference a tracker to determine whether the line of data has been moved. If the data has not yet been moved, the data move engine enables the processor read access of the block of data at the source address. If the data has been moved, the data move engine enables the processor read access of the block of data at the target address. The tracker is an effective tool to track which lines of data have been moved and to then direct read access to either the source address or the target address, accordingly.

In a further implementation, the data move engine receives a write operation corresponding to the line of data. In this implementation, the data move engine utilizes the tracker to determine whether the line of data corresponding to the block of data has been moved. If the data move engine determines the line of data has not yet been moved, the data move engine may write (e.g., modify) the line of data at the source address. If the data move engine determines the line of data has been moved, the data move engine may write the line of data at the target address. Alternatively, if the data move engine determines the line of data is not yet moved, the data move engine may write the line at the target address and record that line of data as moved in the tracker. This implementation provides additional efficiency by enabling the processor with write access during the data move.

In summary, examples disclosed herein provide an effective and transparent manner to move a block of data by enabling a processor to access the block of data concurrently during the move.

Figure 1:
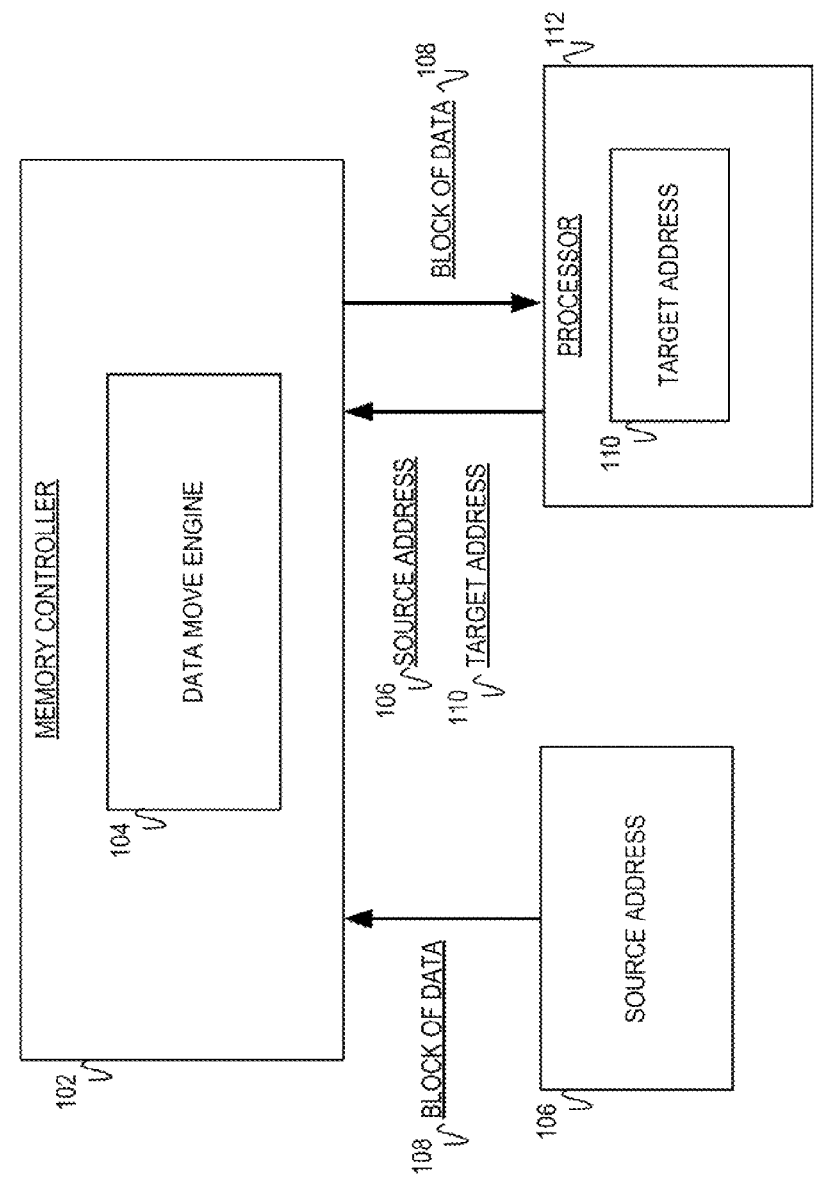
FIG. 1 is a block diagram of an example memory controller include a data move engine to move a block of data from a source address to a target address.

Referring now to the figures, FIG. 1 is a block diagram of an example memory controller 102 including a data move engine 104 to move a block of data 108 from a source address 106 to a target address 110. FIG. 1 illustrates the components within a computing system to move the block of data. The data move engine 104 moves the block of data 108 in a manner which enables a processor 112 to access the block of data 108. Access to the block of data 108 may include a read and/or write operation. The processor 112 may access the block of data 108 at either the source address 106 or the target address 110 depending on whether the block of data 108 has been moved, unmoved, or in-progress. In this implementation, the data move engine 104 enables the processor 112 access to the block of data 108 concurrently during the move. This implementation is described in detail in later figures. The memory controller 102 is a programmable device which manages functionalities of the data move engine 104 to move the block of data 108. As such, implementations of the memory controller 102 includes an electronic device, computing device, microprocessor, microchip, chipset, electronic circuit, semiconductor, microcontroller, central processing unit (CPU), or other type of electronic device programmed to manage resources and functions of the data move engine 104.

The data move engine 104 is a component within the memory controller 102 which is configured to move the block of data 108. The data move engine 104 may move the block of data 108 in cache-line increments. In this implementation, the data move engine 104 may include a tracker (not illustrated) the data move engine 104 utilizes the tracker to determine which lines of data corresponding to the block of data 108 have been moved from the source address 106 to the target address 110. Utilizing the tracker to determine which lines of data corresponding to the block of data 108 have been moved enables the data move engine 104 to provide the processor 112 access to block of data 108 at the source address 106 and/or the target address 110 concurrently during the move. In another implementation, the data move engine 104 may include a hardware component internal to the memory controller 102 to move the block of data 108.

The source address 106 is a location of memory in which the block of data 108 may reside prior to the move by the data move engine 104. The source address 106 is the memory which stores the block of data 108 and as such, implementations of the source address 106 may include read-only memory, dynamic random access memory (DRAM), flash memory, phase-change memory (PCRAM), spin-torque transfer random access memory (STT-RAM), resistive random-access memory (ReRAM), memristor, or other type of computer memory capable of retaining the block of data 108 prior to the move. In one implementation, the source address 106 is included as part of a non-volatile memory. The non-volatile memory may become corrupt over time and/or experience wear-out from multiple writes, etc. Enabling the data move engine 104 to move the block of data from the source address 106 to the target address 110 prevents corruption of the block of data 108, and further wear-out of the source address. In another implementation, an operating system (not illustrated) may transmit both the source address 106 and the target address 110 to initiate the move of the block of data 108.

The block of data 108 is a sequence of bits and/or bytes of data values. The block of data 108 may reside at the source address 106 and upon the move by the data move engine 104 may migrate to the target address 110. During this move, the block of data 108 may be accessed by the processor 112. In one implementation, the block of data 108 is moved in cache-line increments by the data move engine. In this implementation, the processor 112 reads or writes one cache line at a time, as multiple cache lines of data may correspond to the block of data 108. Segregating the block of data 108 into the lines of data enables the data move engine 104 to determine which lines of data have been moved, which lines have not been moved yet (i.e., unmoved), or are in-progress of the move.

The target address 110 is a location of memory associated with the processor 112 into which the block of data 108 is moved by the data move engine 104. The target address 110 may include the location of volatile memory to enable access to the block of data 108 and as such, implementations of the target address 110 include random-access memory, dynamic random-access memory, static memory, or other type of memory capable of storing the block of data 108.

The processor 112 includes the target address 110 to store the block of data 108. The data move engine may concurrently route the processor 112 access of the data 108 to either the source address 106 or the target address 110 depending on whether the access is a read or write access and whether the block of data 108 has been moved. The processor 112 is an electronic device capable of including the target address 110 and as such, implementations of the processor 112 includes a computing device, microprocessor, microchip, controller, chipset, electronic circuit, semiconductor, microcontroller, central processing unit (CPU), or other type of electronic device capable of accessing the target address 110. In one implementation an operating system (not illustrated), associated with the processor 112, provides both the source address 106 and the target address 110 to the data move engine 104. Providing both addresses 106 and 110 triggers the data move engine 104 to begin moving the block of data 108 from the source address 106 to the target address 110. This implementation is discussed in detail in later figures.

Figure 2:
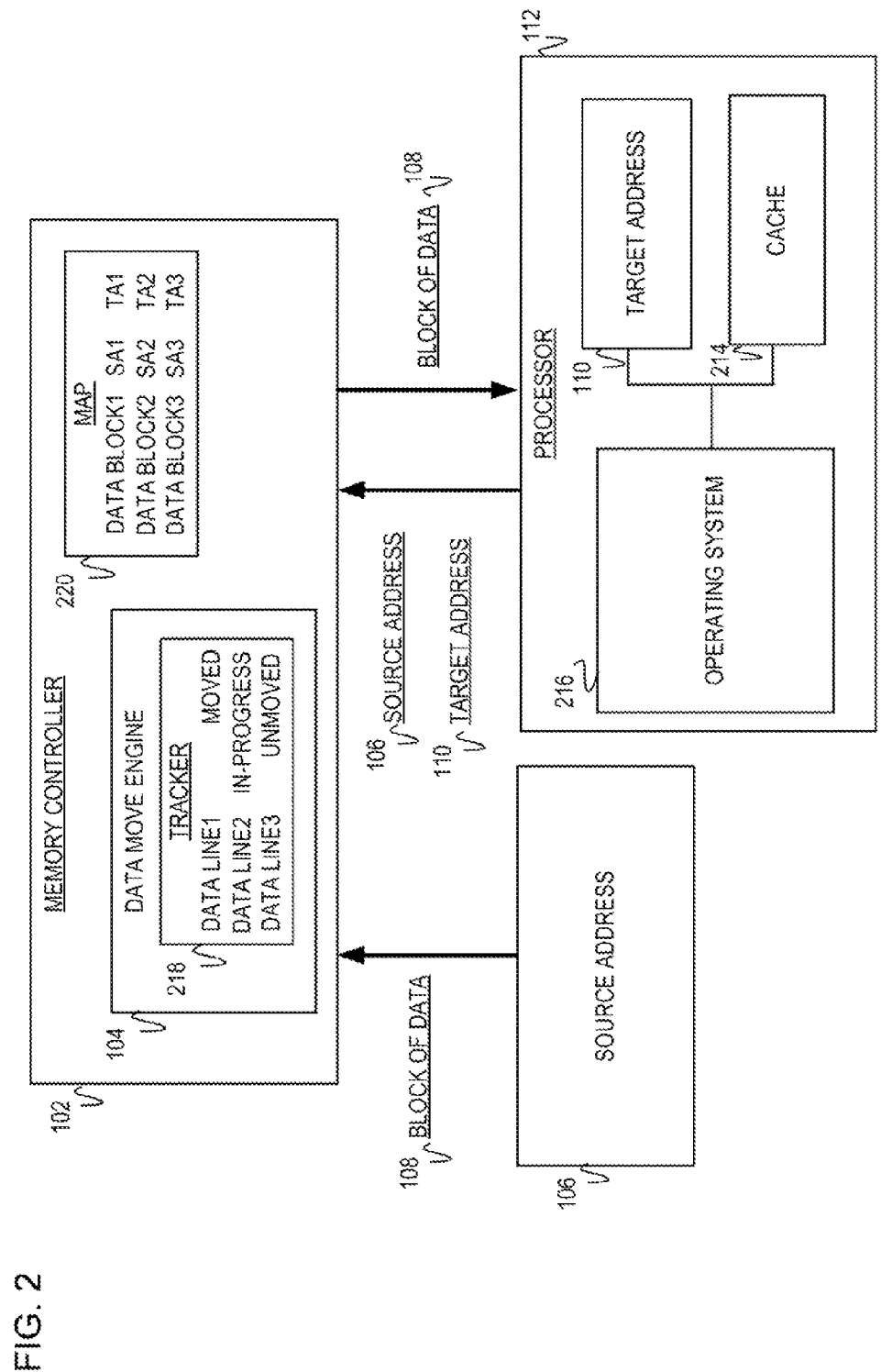
FIG. 2 is a block diagram of an example memory controller including a data move engine and a map to guide access for a block of data from a source address to a corresponding target address, the data move engine is further including a tracker to determine whether a line of data corresponding to the block of data has been moved, unmoved, or in-progress of the move.

FIG. 2 is a block diagram of an example memory controller 102 including a data move engine 104 and a map 220 to redirect a processor 112 to access a block of data 108 from a source address 106 to a corresponding target address 110. The data move engine 104 includes a tracker 218 to determine whether a particular line of data progression of the move of the block of data 108. The block of data 108 may include multiple data lines and as such, the lines of data may include various states of the move progression. For example, the tracker 218 may determine whether the particular line of data corresponding to the block of data 108 is in the move state, not-moved state (i.e., unmoved), or a move-in-progress state. Additionally an operating system 216, associated with the processor 112, initiates the data move engine 104 to move the block of data 108 by transmitting the source address 106 and the target address 110. In another implementation of FIG. 2, a cache 214 associated with the processor 112, flushes a cache line of data corresponding to the block of data 108 upon completion of the move of that cache line from the source address 106 to the target address 110. In this implementation, the line is flushed from the cache once the block of data 108 has been moved to the target address 110.

The operating system 216, initiates the move of the data block 108 from the source address 106 to the target address 110. In this manner, the operating system 216 provides the available location into which to move the block of data 108. In this implementation, the operating system 216 may be aware of the move of the block of data 108, but may not track the cache-line increments that are moved line-by-line from the source address 106 to the target address 110. The data move engine 104 may transmit an interrupt when the move is complete. The interrupt signals the operating system to flush any remaining data from the cache 214 associated with the processor 112 that may have been used during the move. Alternatively, the data move engine may signal the cache 214 to flush any remaining data. Additionally, the interrupt from the data move engine 104 indicates to the operating system 216 to update a page table so the block of data 108 is associated with the target address 110 and no longer associated with the source address 106. This provides direct access to the block of data 108 at the target address 110. This implementation is described in detail in later figures.

In another implementation, the data move engine 104 may write a value to an internal control register (not illustrated) to initiate the moving of the block of data 108. In a further implementation, the move of the block of data 108 may be initiated by modifying a descriptor within the map 220. In yet a further implementation, the move of the data block 108 may be triggered by a condition. The condition may include a wear-out detection at the source address 106, reaching a threshold number of writes to the source address 106, and/or a policy-based implementation by the operating system 216, such as on a write access, as well as other conditions that may be appropriate to trigger a data move. These conditions are described in detail in later figures.

The map 220 is utilized to track the location of the data block 108 given the source address through a descriptor. In one implementation, a block of address ranges corresponding to the target address 110 is mapped to a block of address ranges corresponding to the source address 106. The mapping is tracked by descriptors (not illustrated) kept as metadata for each block of the target address 110. Each block of data 108 may include multiple lines of data (DATA LINE1, DATA LINE2, and DATA LINE3) as in the tracker 218. Although FIG. 2A illustrates multiple blocks of data (DATA BLOCK1, DATA BLOCK 2, and DATA BLOCK 3) in the map 220, implementations should not be limited as this was done for illustration purposes. The memory controller 102 uses the map 220 to guide access of the given source address to redirect the data move engine 104 to access the block of data 108 at the target address 110, when desired. In this implementation, the memory controller 102 includes 220 to map the source address 106 to the target address 110 to access the block of data 108 at the target address 110 given the source address 106. For example, the map 220 may include multiple data blocks (DATA BLOCK1, DATA BLOCK 2, and DATA BLOCK 3), the given source addresses (SA1, SA2, and SA3), and the corresponding target addresses (TA1, TA2, and TA3). For example, the memory controller 102 may direct the processor 112 to access the particular block of data (DATA BLOCK1, DATA BLOCK 2, or DATA BLOCK 3) at the corresponding target address (TA1, TA2, and/or TA3) given the source address (SA1, SA2, or SA3).

The tracker 218 is utilized by the data move engine 104 to track the particular lines of data ((DATA LINE1, DATA LINE2, and DATA LINE3) in the various states of the progression of the move. In this implementation, the block of data 108 includes multiple data lines (DATA LINE1, DATA LINE2, and DATA LINE3) for the data move engine 104 to reference. When the data move engine 104 may receive a read or write operation for one of the multiple data lines, the data move engine 104 references the tracker 218 to determine whether to direct access to the source address 106 or the target address 110. For example, transactions that arrive at the data move engine 104 are checked against moves that have been completed or in progress of occurring. In a further example, if the transaction is a write transaction, the data move engine 104 checks state of the particular line of data. If the particular line of data is in the not-moved yet state, the write may be directed to the target address 110 for the particular line of data and the line may be marked as "moved," in the tracker 218. The tracker may be sized to keep track of each cache line in each of the data blocks that can be moving simultaneously.

In another implementation, the data move engine 104 may determine to move the block of data 108 from the target address 110 back to the source address 106. In this implementation, blocks of data 108 may not be permanently stored at the target address 110 (i.e., non-permanent) and may eventually be moved back to the source address 106. This may be due to the operating system 216 deciding to free up a portion of the target address 110 and/or if the block of data 108 is committed to the source address 106 for storage. The operating system 216 may trigger the data move engine 104 to initiate the move. The data move engine 104 may proceed to access each cache-line of the block of data 108 from the target address 110 and write each line to the source address 106. During this move, a read access request from the processor 112 may cause the requested line of data corresponding to the block of data 108, to move out of sequence of the move from the target address 110 to the source address 106 and be returned to the processor 112. Alternatively, the operating system 216 may track permissions to the cache lines of data corresponding to the block of data 108 and allow read-access to the block of data 108 at the target address 110. In this situation, the data move engine 104 signals to the operating system 216 when the move is complete with an interrupt, then the operating system 216 may re-allocate the target address 110 and/or re-enable read and write access.

Figure 3:
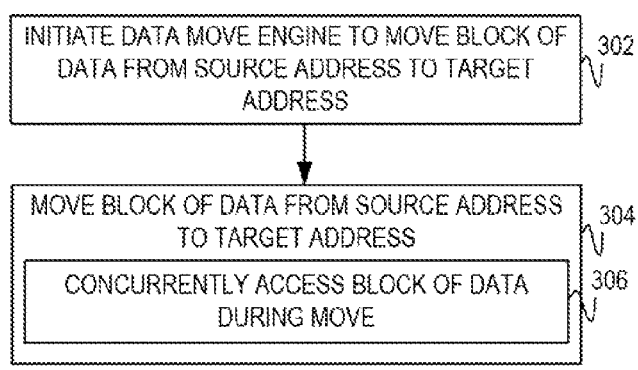
FIG. 3 is a flowchart of an example method to initiate a move of a block of data from a source address to a target address and to move the block of data, accordingly.

FIG. 3 is a flowchart of an example method to initiate a move of a block of data from a source address to a target address and to move the block of data, accordingly. A data move engine, under a control of a memory controller is triggered to move the block of data. Moving the data block from the source address to the target address may prevent data corruption and device wear-out that may occur at the source address. Additionally, enabling concurrent access to the block of data during the move eliminates delays by allowing immediate access to the data throughout the moving process. In discussing FIG. 3, references may be made to the components in FIGS. 1-2 to provide contextual examples. Further, although FIG. 3 is described as implemented by a data move engine 104 and/or memory controller 102 as in FIG. 1, it may be implemented on other suitable components. For example, FIG. 3 may be implemented in the form of executable instructions on a machine readable storage medium, such as machine-readable storage medium 604 as in FIG. 6.

At operation 302, the data move engine is initiated to move the block of data from the source address to the target address. The block of data may be moved in cache-line increments so the data move engine may track which lines of the block of data have been moved. In one implementation, the move initiation may be triggered by an operating system. The operating system provides both the source address and the target address to the data move engine. In this implementation, the initiation of the move may be generated by writing one or more values to internal registers in the data move engine and/or by updating a descriptor within the memory controller. The descriptor is metadata associated with the source address that may redirect the processor to access the block of data at the target address rather than source address. During operations 302-306, the operating system may continue to use the source address. For example, the operating system does not change the referenced address of the block of data in its page tables, but rather continues to point to the source address as the location of the block of data. The memory controller may receive the source address of the block of data and, utilizing a table (i.e., map), the memory controller may determine the target address corresponding to the source address. During operations 302-306, the operating system may maintain permissions to enable write accesses to the block of data. In another implementation, the move may be triggered by a condition or event of the source address. In this implementation, the move may be triggered by one of the following: detection by the memory controller that the source address may be wearing out; the memory controller determining a certain number of writes have been reached; a policy implementation by the operating system. In these events, the memory controller and/or the operating system may transmit an instruction, or other indication to the data move engine to move the block of data from the source address to the target address.

At operation 304, the data move engine moves the block of data from the source address to the target address. Once the move is initiated at operation 302, the data move engine begins to access the block of data at the source address as indicated by the descriptor and moves the block of data in cache-line increments to the target address. During this operation, the data move engine participates in the processor coherency domain to request ownership of each target address cache line and update it with data from the source address cache line. At operation 304, the data move engine utilizes a tracker to track the move of the block of data as it progresses. In this implementation, the block of data may be moved line by line, thus the tracker determines which lines have been moved, unmoved, and are in-the-process of being moved. During the move at operation 304, a processor is enabled access to the block of data as at operation 306.

At operation 306, the data move engine may enable a processor to concurrently access the block of data during the move. Enabling concurrent access to the block of data during the move at operation 304 provides the move in a transparent manner. The transparent manner enables the processor to read and/or write the block of the data as it is being moved at operation 304. The data move engine utilizes a tracker to determine which lines of data corresponding to the block of data have been moved, are unmoved, or are in-progress of being moved. In this implementation, the data move engine may receive a transaction of read and/or write access corresponding to a particular line of data. The data move engine uses the tracker to reference whether the line has been moved, is still unmoved, and/or is in-progress of the move to appropriately direct the processor to access the line of data from either the target address or the source address. In one implementation, the data move engine may receive the read transaction or operation requesting read access to the particular line of data corresponding to the block of data. In this implementation, the data move engine may provide read access to the processor from either the source address or the target address. In another implementation, the data move engine may receive a write operation to modify the particular line of data. In this implementation, the data move engine may modify the line of data at either the source address or the target address depending on whether the line of data has been moved. For example, if the line of data is unmoved (i.e., is still at the source address), then the data move engine may modify the line of data at the source address. If the line of data has been moved to the target address, the data move engine may modify the line of data at the target address. Alternatively, if the line of data is not yet moved, or is currently being moved (i.e., in-progress move), the data move engine may modify the line of data at the target address and mark that line of data as moved in the tracker. These implementations are discussed in detail in a later figure.

Figure 4:
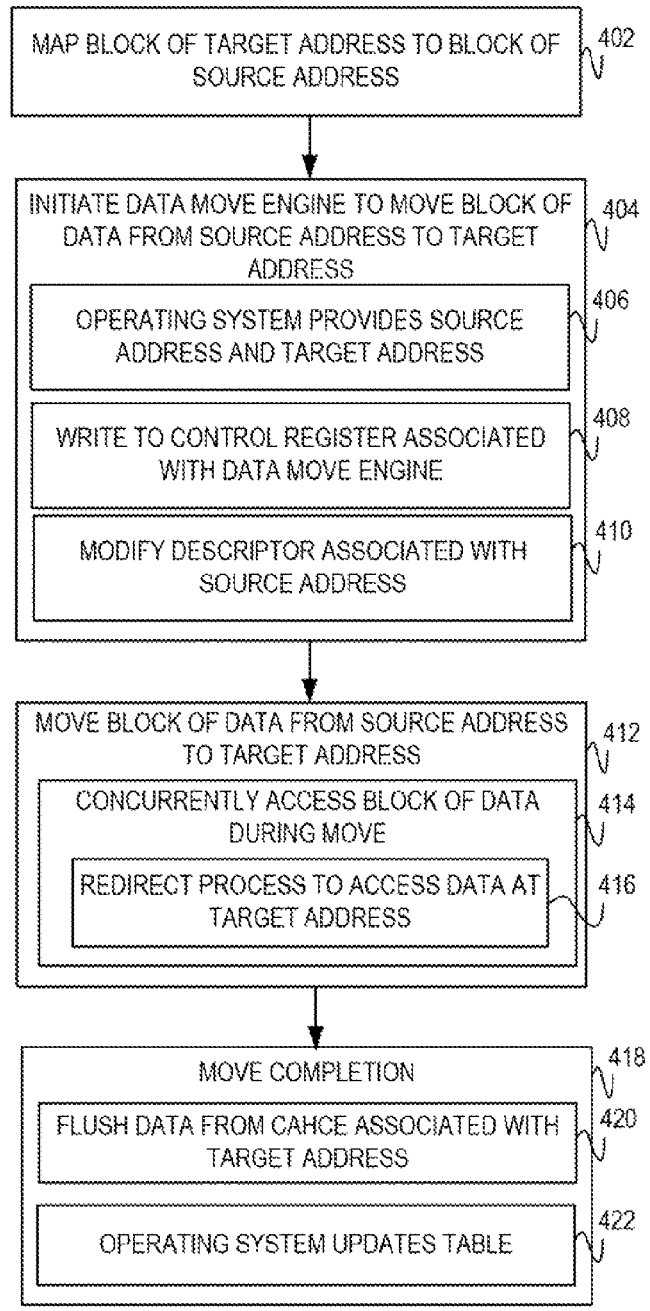
FIG. 4 is a flowchart of an example method to map a block of a target address to a block of a source address and to move of a block of data from the source address to the target address.

FIG. 4 is a flowchart of an example method to map a block of a target address(es) to a block of a source address(es) by using descriptors, initiating a move of a block of data, moving the block of data accordingly, and completing the move. Mapping the block of the target address(es) to the block of source address(es) provides a mechanism for the memory controller to generate a correspondence between the block of data from the source address to the target address. This correspondence enables the memory controller to redirect the processor given the source address to the target address. In discussing FIG. 4, references may be made to the components in FIGS. 1-2 to provide contextual examples. Further, although FIG. 4 is described as implemented by a data move engine 104 and/or memory controller 102 as in FIG. 1, it may be executed on other suitable components. For example, FIG. 4 may be implemented in the form of executable instructions on a machine readable storage medium, such as machine-readable storage medium 604 as in FIG. 6.

At operation 402, a memory controller associated with the data move engine, maps (i.e., associates) the block of the source addresses to the block of the target addresses. The block of addresses includes a range of addresses in the source address space and in the target address space, respectively. The mapping is tracked by descriptors which are kept as metadata for each target address block (e.g., range of addresses). The memory controller utilizes the descriptors to guide access for the processor from the source address to the target address. Alternatively, the mapping may remain, once modified data is committed to the source address(es).

At operation 404, the data move engine is initiated to move the block of data from the source address to the target address. The initiation of the move may be implemented by at least one of the operations 406-410. Operation 404 may be similar in functionality to operation 302 as in FIG. 3.

At least one of the operations 406-410 may be executed to initiate the move of the data block from the source address to the target address. In one implementation, one of the operations 406-410 may occur to trigger the move initiation at operation 404. In another implementation, a combination of operations 406-410 may occur to trigger the move initiation at operation 404. At operation 406, the operating system may provide the source address and the target address to the data move engine. At operation 408, the data move engine may write a value to a control register. The control register is a processor register, associated with the data move engine, which controls the behavior of the data move engine. In one implementation of operation 408, the control register may receive an instruction, signal, command, or other indication, signaling move initiation. At operation 410, the descriptor, associated with the source address, may be modified to trigger the initiation of the move.

At operations 412-414, the data move engine moves the block of data from the source address to the target address in a manner which enables the processor to access the block of data during the move. In another implementation, the data move engine enables access to the block of data by redirecting the processor data access to the target address given the source address as at operation 416. Operations 412-414 may be similar in functionality to operations 304-306 as in FIG. 3.

At operation 416, the processor may be redirected to access the block of data at the target address through the descriptor mapped at operation 402. The source address includes the descriptor which is mapped at operation 402, which provides the guidance to redirect the processor to access the block of data at the target address.

At operations 418-422, upon completion of the move, the method may proceed to operations 420-422. At operation 418, the data move engine may transmit an interrupt to the processor. At operation 420, the interrupt signals to the processor and operating system to initiate a flushing of the data from the associated system cache(s). In this implementation, the source address may be marked as unreadable as the block of data has been moved to the target address and the block of data at the source address is an out-of-date copy. At operation 420, the memory controller may write the descriptor indicating the move has been complete. This descriptor write triggers the memory controller to recall the cache lines that may have been accessed from the source block. In one implementation, the memory controller may utilize its bit-vector tracking to determine which cache lines of the block of data may have been accessed. The data move engine may alternatively begin recalling cache lines from the moved data block when the interrupt is signaled. The data move engine may view any updates and forward them to the new address. The descriptor write enables the method to proceed to operation 422. At operation 422, the operating system may update an entry within a table (e.g., page table). In this operation, the operating system may point to the relevant page table entry to re-enable access to the block of data directly to the target address.

In another implementation, rather than the method proceeding to operations 418-422 to complete the move, the data move engine may determine that the block of data moved to the target address may be considered non-permanent. Moving the block of data back to the source address enables memory space to be available for more active blocks of data. In this implementation, the data move engine initiates the move of the block of data from the target address back to the source address.

Figure 5:
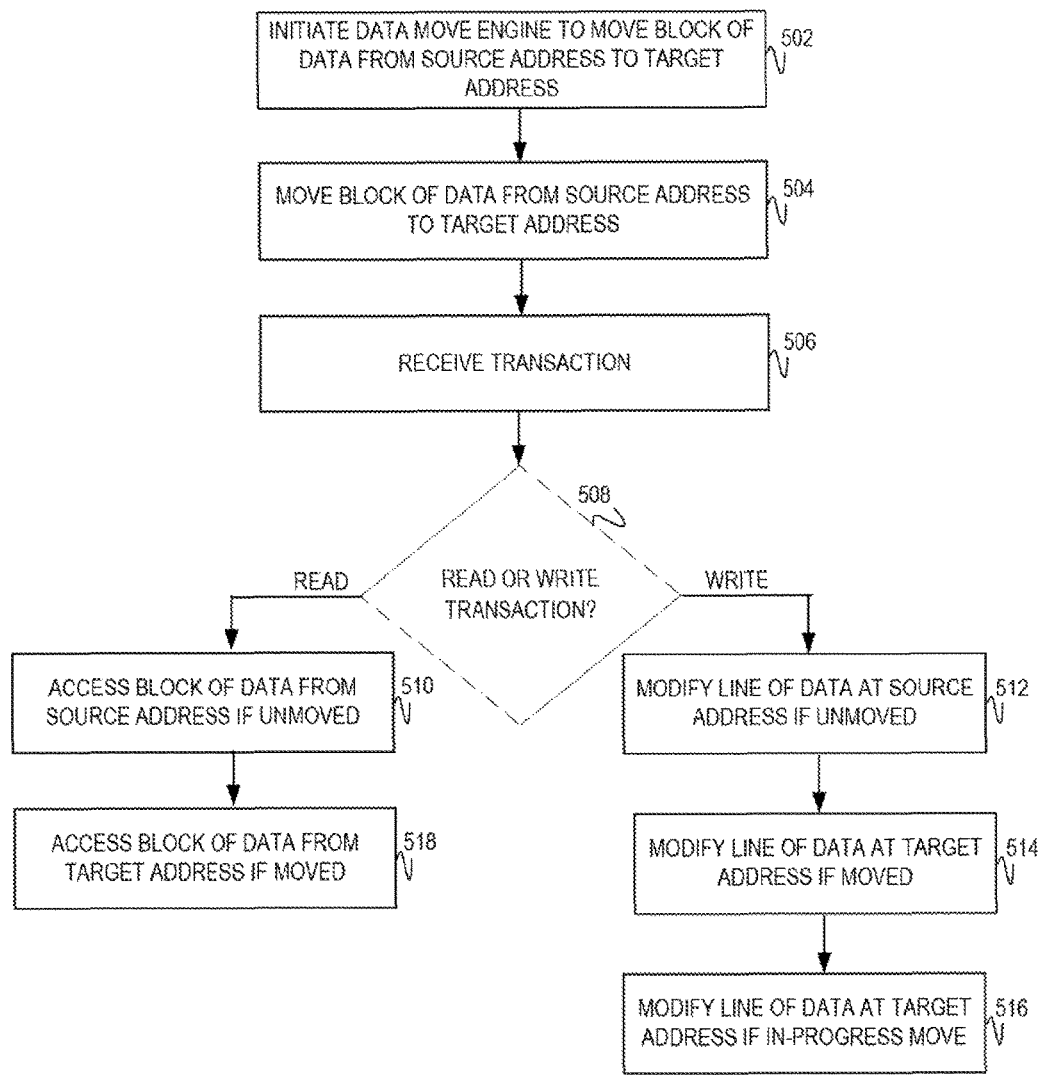
FIG. 5 is a flowchart of an example method to initiate a move of a block of data from a source address to a target address, receive a read or write transaction, and access the block of data, accordingly.

FIG. 5 is a flowchart of an example method to initiate a move of a block of data from a source address to a target address, receive a read or write transaction, and access the block of data, accordingly. Specifically FIG. 5 illustrates the method in which a processor is enabled to access to the block of data when receiving read and/or write operation. Further, the term "transaction," may refer to an "operation," and as such the two terms may be used interchangeably throughout. In discussing FIG. 5, references may be made to the components in FIGS. 1-2 to provide contextual examples. Further, although FIG. 5 is described as implemented by a data move engine 104 and/or memory controller 102 as in FIG. 1, it may be executed on other suitable components. For example, FIG. 5 may be implemented in the form of executable instructions on a machine readable storage medium, such as machine-readable storage medium 604 as in FIG. 6.

At operation 502, the data move engine is initiated to move the block of data from the source address to the target address. Operation 502 may be similar in functionality to operation 302 and operation 404 as in FIGS. 3-4.

At operation 504, the data move engine may move the block of data from the source address to the target address. In another implementation, the move may include a copy-on-write move. The copy-on-write move may ensure accuracy of the block of data when the block of data may potentially be modified as the move occurs. After the move, both the source address and the target address remain active. In this operation, the data move engine may include visibility to write operations so it can complete the move of the affected cache line of data within the block of data prior to the modification of that cache line of data. This may be achieved by the data move engine enabling the processor access to the block of data by at least one of the following: enabling the processor read access to the source address; enabling the processor read access to the target address; and enabling the processor read and write access to the source address. On completion of the move, the modified cache line of data may be directed to the target address.

At operation 506, the data move engine may receive the read or write operation. Once receiving the operation, the data move engine may determine whether the operation which includes the read access or write access at operation 508 to proceed to either operations 512-516 or operations 510 and 518, accordingly. The operation may be received by the data move engine during the process of moving cache-line increments corresponding to the block of data from the source address to the target address. In a further implementation of operation 506, the data move engine may receive a block-zero operation. In this implementation, the lines of data at the source address may be hardcoded to all zeros, thus requiring all writes to be routed to the target address and marked as moved by the tracker.

At operation 508, the data move engine may determine whether the received operation includes read or write access. In another implementation, operation 508 may also determine whether the line of data corresponding to the block of data has been moved. In this implementation, the data move engine may reference tracker (e.g., table) to determine if the line of data has been moved. The tracker tracks which cache-lines corresponding to the block of data have been moved, are unmoved, or are currently being moved (i.e., in-progress moves). This enables the processor to modify the particular line of data at either the source address or the target address. If the operation includes read access, the method proceeds to operations 510 and 518. If the operation includes write access, the method proceeds to operations 512-516.

At operation 510, upon determining that the line of data corresponding to the block of data has not been moved or alternatively, in the unmoved state from the source address to the target address. At operation 510, the data move engine enables the processor to access the line of data from the source address. In this implementation, the processor may transmit a request to the data move engine for a particular line of data corresponding to the block of data. The data move engine may verify that the line of data is unmoved, thus the processor may access that line of data from the source address. If the data move engine determines the particular line of data (e.g., cache-line increment of the block of data) has been moved from the source address to the target address, the method proceeds to operation 518.

At operation 518, upon determining that the line of data has been moved, the data engine allows the processor read access to that particular line of data from the target address. In this operation, the data move engine references the tracker to verify that the line of data corresponding to the block of data has been moved. If the line of data has been moved, the processor may access the line of data from the target address.

At operations 512-516, the processor may modify the line of data (i.e., write the line of data) at either the source address or the target address depending on whether the line of data has been moved. The data move engine utilizes the tracker to determine which lines of data corresponding to the block of data have been moved. At operations 512-516, the write operation includes the line of data corresponding to the line of data in which is to be modified. At operation 512, the data move engine may determine that the line of data corresponding to the block of data is unmoved (i.e., the line of data is still at the source address). In this implementation, the processor may modify that particular line of data at the source address. At operation 514, the data move engine may determine that the particular line of data has been moved previously from the source address to the target address. In this implementation, the processor may modify that particular line of data at the target address. At operation 516, the data move engine may determine that the particular line of data is an in-progress move and as such, the processor may modify that particular line of data at the target address while the data move engine may mark that particular line of data as moved in the tracker.

Figure 6:
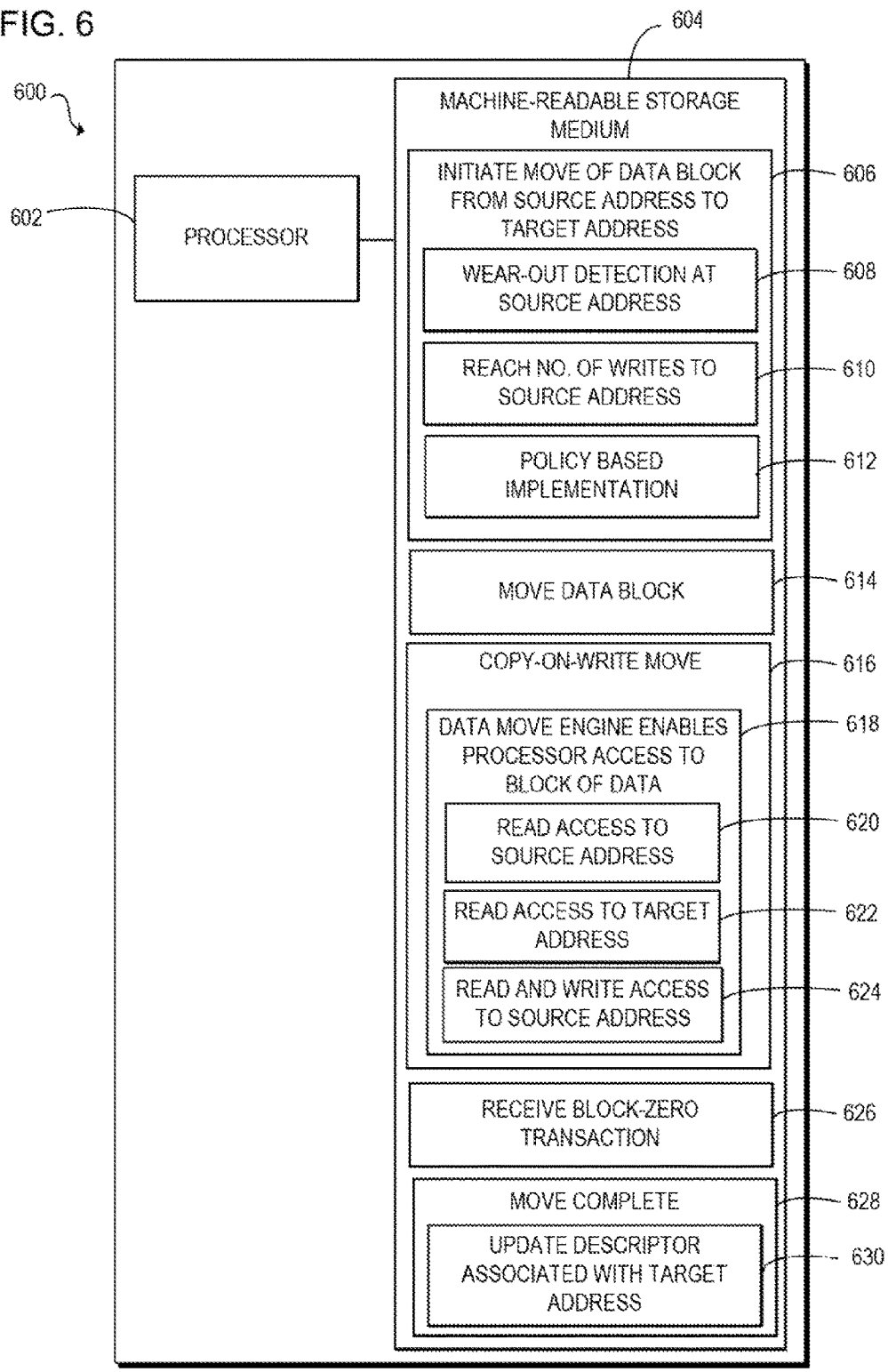
FIG. 6 is a block diagram of an example computing device with a processor to execute instructions in a machine-readable storage medium for initiating a move of a block of data and moving the block of data from a source address to a target address, accordingly.

FIG. 6 is a block diagram of computing device 600 with a processor 602 to execute instructions 606-630 within a machine-readable storage medium 604. Specifically, the computing device 600 with the processor 602 is to initiate a move of a block of data and moving the block of data from a source address to a target address, accordingly. Although the computing device 600 includes processor 602 and machine-readable storage medium 604, it may also include other components that would be suitable to one skilled in the art. For example, the computing device 600 may include the data move engine 104 as in FIG. 1. The computing device 600 is an electronic device with the processor 602 capable of executing instructions 606-630, and as such, embodiments of the computing device 600 include a computing device, mobile device, client device, personal computer, desktop computer, laptop, tablet, video game console, or other type of electronic device capable of executing instructions 606-630. The instructions 606-630 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-630 to initiate the move of the block of data and moving the block of data, accordingly. In one implementation, the processor 602 may execute one of instructions 606-612 to initiate the block of data move. In another implementation, once executing instruction 606, the processor 602 may then execute instruction 614-624 to move the block of data as a copy-on-write move. In a further implementation, once executing instructions 606 and 614, the processor 602 may execute instruction 626 to receive a bock-zero transaction. In yet another implementation, once executing instructions 606, 614, 616-624 and/or 626, the processor 602 may execute instructions 628-630 to complete the move of the block of data. Specifically, the processor 602 executes instructions 606-612 to: initiate the move of the data block, the initiation triggered by one of instructions 608-612; detect a wear-out at the source address; reach a number of writes at the source address; and a policy based implementation. The processor may then execute instructions 614 to move the block of data from the source address to the target address, instruction 614 may include moving the block of data line by line from the source address to the target address. Additionally, the processor 602 may execute instructions 616-624 and/or instruction 626 to: move the block of data as a copy-on-write move; enable the processor to access the block of data by executing one of instructions 620-624; grant read access of the block of data at the source address; grant read access of the block of data at the target address; and grant read and write access of the block of data at the source address. Finally, the processor 602 may execute instructions 628-630 to: complete the move of the block of data; and upon the move completion, a descriptor associated with the target address is updated so the block of data is associated with just the target address rather than with both the source address and the target address.

The machine-readable storage medium 604 includes instructions 606-630 for the processor to fetch, decode, and execute. In another implementation, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein provide an effective and transparent manner to move a block of data by enabling a processor access to the block of data concurrently during the move.

We claim:

1. A method, executable by a computing device to move a block of data between a source address and a target address, the method comprising:
    initiating a data move engine to move the block of data from the source address to the target address; and
    moving each line of data within the block of data from the source address to the target address;
    tracking a move progress for each line of data; and
    allowing a processor to concurrently access each line of data within the block of data during the move based on the move progress comprises:
        receiving a read operation that corresponds to a line of data in the block of data;
        in response to a determination that the line of data has not yet been moved to the target address, accessing the block of data from the source address; and
        in response to a determination that the line of data has been moved to the target address, accessing the block of data from the target address.

2. The method of claim 1 wherein to allow the processor to concurrently access the block of data during the move is further comprising:
    mapping a block of the target address to a block of the source address by a descriptor associated with the target address; and
    redirecting the processor to access the block of data at the target address when the source address is presented.

3. The method of claim 1 wherein initiating the data move engine to move the block of data from the source address to the target address is further comprising:
    providing, by the operating system, the source address and the target address to the date move engine.

4. The method of claim 1 wherein initiating the data move engine to move the block of data from the source address to the target address is further comprising one of the following:
    writing to a control register associated with the data move engine; and
    modifying a descriptor associated with the source address.

5. The method of claim 1 further comprising:
    receiving a write operation corresponding to a line of data within the block of data;
    in response to the determination that the line of data remains unmoved, modifying the line of data at the source address;
    in response to the determination that the line of data is an in-progress moved, modifying the line of data at the target address, wherein the line of data is marked as moved; and
    in response to the determination that the line of data has moved, modifying the line of data at the target address upon a determination the line of data corresponds to a moved line of data.

6. The method of claim 1 further comprising:
    flushing data from a cache associated with the target address; and
    updating a table, by the operating system, to reference the block of data from the target address rather than the source address upon completion of the move.

7. The method of claim 1 wherein allowing a processor to concurrently access each line of data within the block of data based on the move progress comprises:
   determining which address to modify the line of data via identification of the move progress for each line of data.

8. A memory system comprising:
   a data move engine to:
   based on receipt of a source address and a target address, move a block of data from the source address to the target address;
   during the move, track a move progress for the block of data such that the tracked move progress identifies which address for a processor to access the block of data; and
   redirect the processor to the identified address such that the processor may access the block of data throughout the move including:
      in response to receipt of a write operation corresponding to a line of data within the block of data, utilize a tracker to determine if a line of data within the block of data has moved;
      in response to the determination the line of data has been moved, modify the line of data at the target address; and
      in response to the determination the line of data corresponds to an in-progress move, modify the line of data at the target address; and
   the tracker, coupled to the data move engine, to record the move of the line of data.

9. The memory system of claim 8 further comprising:
   a memory controller to map the source to target address, wherein the map guides the processor to access the block of data at the target address given the source address; and
   a cache, associated with the processor, to flush a line of data corresponding to the block of data upon the move completion.

10. A non-transitory machine-readable storage medium encoded with instructions executable by a processor of a computing device, the storage medium comprising instructions to:
   initiate a data move engine to move a block of data from a source address to a target address;
   move the block of data from the source address to the target address;
   track the move of the block of data in a manner which allows a processor to concurrently access the block of data during the move by directing the processor to access the block of data at the target address given the source address; and
   receive a block-zero operation that causes the data move engine to restrict read access to a line of data corresponding to the block of data that has been previously moved.

11. The non-transitory machine-readable storage medium including the instructions of claim 10 wherein to initiate the data move engine to move the block of data from the source address to the target address is triggered by one of the following conditions:
   wear-out detection at the source address;
   reaching a number of writes to the source address;
   policy-based implementation by an operating system.

12. The non-transitory machine-readable storage medium including the instructions of claim 10 and comprising instructions to:
   based on completion of the move of the block of data, update a descriptor in a memory controller, the descriptor corresponds to a location of the block of data in the target address.

13. The non-transitory machine-readable storage medium including the instructions of claim 10 wherein the move includes a copy-on-write move and further wherein the data move engine is further comprising instructions to enable the processor access to the block of data by one of the following:
   enable the processor read access to the source address;
   enable the processor read access to the target address; and
   enable the processor read and write access to the source address.

14. The non-transitory machine-readable storage medium including the instructions of claim 10 wherein to track the move of the block of data comprises instructions to:
   in determination that a line of data within the block of data has been moved to the target address, direct the processor to access the line of data at the target address.

15. The non-transitory machine-readable storage medium including the instructions of claim 10 wherein to track the move of the block of data comprises instructions to:
   in determination that a line of data within the block of data has not yet been moved to the target address, direct the processor to access the line of data at the source address.

* * * * *